US012777374B2

(12) United States Patent
Lee et al.

(10) Patent No.: US 12,777,374 B2
(45) Date of Patent: Oct. 27, 2026

(54) COMMUNICATION METHOD AND DEVICE IN WIRELESS COMMUNICATION SYSTEM SUPPORTING NETWORK SLICING

(71) Applicant: Samsung Electronics Co., Ltd., Suwon-si (KR)

(72) Inventors: Hoyeon Lee, Suwon-si (KR); Sangsoo Jeong, Suwon-si (KR); Erik Guttman, Staines (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 356 days.

(21) Appl. No.: 17/926,411

(22) PCT Filed: May 21, 2021

(86) PCT No.: PCT/KR2021/006334
§ 371 (c)(1),
(2) Date: Nov. 18, 2022

(87) PCT Pub. No.: WO2021/235887
PCT Pub. Date: Nov. 25, 2021

(65) Prior Publication Data
US 2023/0199570 A1 Jun. 22, 2023

(30) Foreign Application Priority Data
May 21, 2020 (KR) ........................ 10-2020-0061198

(51) Int. Cl.
*H04W 36/00* (2009.01)
*H04W 36/14* (2009.01)
*H04W 76/18* (2018.01)

(52) U.S. Cl.
CPC ........ *H04W 36/0011* (2013.01); *H04W 36/14* (2013.01); *H04W 76/18* (2018.02)

(58) Field of Classification Search
CPC . H04W 36/0011; H04W 36/14; H04W 76/18; H04W 36/22; H04W 36/385; H04W 48/18; H04W 76/10; H04W 80/10
See application file for complete search history.

(56) References Cited

U.S. PATENT DOCUMENTS

2018/0199398 A1 7/2018 Dao et al.
2018/0376445 A1 12/2018 Yoon et al.
(Continued)

FOREIGN PATENT DOCUMENTS

CN 111034336 A 4/2020
EP 3506598 A1 7/2019
(Continued)

OTHER PUBLICATIONS

3GPP TR 23.700-40 V0.3.0 (Jan. 2020); 3rd Generation Partnership Project; Technical Specification Group Services and System Aspects; Study on enhancement of network slicing; Phase 2 (Release 17) (Year: 2020).*
(Continued)

*Primary Examiner* — Marisol Figueroa
(74) *Attorney, Agent, or Firm* — Jefferson IP Law, LLP

(57) ABSTRACT

The present disclosure relates to a communication method and device in a wireless communication system supporting network slicing, and, according to an embodiment of the present disclosure, a method performed by a terminal in a wireless communication system supporting network slicing comprises steps in which: a terminal transmits a session establishment request message for a first network slice through a first access network; a session establishment rejection message is received through the first access network from a network entity for managing a session for the first network slice; and handover to a second access network, which is the preferred access network of the terminal, is determined if the session establishment rejection message
(Continued)

includes, as the cause of rejection of the session establishment request, information that indicates the number of sessions exceeding the maximum number of sessions for the first network slice.

12 Claims, 5 Drawing Sheets

(56) References Cited

U.S. PATENT DOCUMENTS

| | | | |
|---|---|---|---|
| 2019/0306761 | A1 | 10/2019 | Jin et al. |
| 2019/0364463 | A1 | 11/2019 | Youn et al. |
| 2020/0154350 | A1 | 5/2020 | Dao et al. |
| 2020/0178196 | A1 | 6/2020 | Wang et al. |
| 2020/0252813 | A1 | 8/2020 | Li et al. |
| 2020/0344647 | A1 | 10/2020 | Zhu et al. |

FOREIGN PATENT DOCUMENTS

| | | | | |
|---|---|---|---|---|
| EP | 3557905 | A1 | 10/2019 | |
| IN | 201937033158 | A | 3/2020 | |
| KR | 10-2019-0021462 | A | 3/2019 | |
| KR | 10-2019-0117648 | A | 10/2019 | |
| KR | 10-2020-0035146 | A | 4/2020 | |
| KR | 10-2021-0087862 | A | 7/2021 | |
| WO | WO-2018145723 | A1 * | 8/2018 | ............ H04W 76/10 |
| WO | 2019/056970 | A1 | 3/2019 | |
| WO | 2019/137549 | A1 | 7/2019 | |
| WO | WO-2021119627 | A1 * | 6/2021 | ............ H04W 76/30 |
| WO | WO-2021161193 | A1 * | 8/2021 | ............ H04W 16/10 |

OTHER PUBLICATIONS

Partial Supplementary European Search Report dated Nov. 2, 2023, issued in European Patent Application No. 21809393.8.

NTT DOCOMO, KDDI, Deutsche Telekom, Nokia, Vodafone, Telecom Italia, AT&T, ZTE, NEC, Cisco, LG Electronics, Telstra, Verizon, ORANGE; Addition of PDU Session type IPV4v6; 3GPP TSG-SA WG2 Meeting #126, S2-182707, Mar. 19, 2018, Montreal, Canada.

CATT, Solution for support of network slice related quota on the maximum number of PDU Sessions, S2-2000809, 3GPP TSG-SA WG2 Meeting #136AH, Jan. 7, 2020, Incheon, Korea.

Japanese Office Action dated Dec. 17, 2024, issued in Japanese Patent Application No. 2022-571084.

3GPP TR 23.700-40 V0.3.0; Study on enhancement of network slicing; Phase 2 (Release 17), Japanese 30, 2020.

3GPP TS 23.502 V16.4.0; Procedures for the 5G System (5GS); Stage 2 (Release 16), Mar. 27, 2020.

Huawei, HiSilicon; Solution of Key Issue #2 Support of network slice related quota on the maximum number of PDU sessions, SA WG2 Meeting #136 Adhoc, S2-2001649; Jan. 17, 2020.

Extended European Search Report dated Feb. 29, 2024, issued in European Patent Application No. 21809393.8.

Chinese Office Action dated Jun. 14, 2025, issued in a Chinese Patent Application No. 202180037436.6.

European Office Action dated Jul. 10, 2025, issued in a European Patent Application No. 21 809 393.8.

Korean Office Action dated Nov. 20, 2025, issued in a Korean Patent Application No. 10-2020-0061198.

Korean Office Action dated Aug. 27, 2026, issued in Korean Patent Application No. 10-2020-0061198.

* cited by examiner

COMMUNICATION METHOD AND DEVICE IN WIRELESS COMMUNICATION SYSTEM SUPPORTING NETWORK SLICING

CROSS-REFERENCE TO RELATED APPLICATION(S)

This application is a U.S. National Stage application under 35 U.S.C. § 371 of an International application number PCT/KR2021/006334, filed on May 21, 2021, which is based on and claims priority of a Korean patent application number 10-2020-0061198, filed on May 21, 2020, in the Korean Intellectual Property Office, the disclosure of which is incorporated by reference herein in its entirety.

TECHNICAL FIELD

The disclosure relates to a communication method and device in a wireless communication system supporting network slicing.

BACKGROUND ART

In order to meet the demand for wireless data traffic soaring since the $4^{th}$ generation (4G) communication system came to the market, there are ongoing efforts to develop enhanced $5^{th}$ generation (5G) communication systems or pre-5G communication systems. For the reasons, the 5G communication system or pre-5G communication system is called the beyond 4G network communication system or post LTE system. For higher data transmit rates, 5G communication systems are considered to be implemented on ultra-high frequency bands (mmWave), such as, e.g., 60 GHz. To mitigate pathloss on the ultra-high frequency band and increase the reach of radio waves, the following techniques are taken into account for the 5G communication system, such as beamforming, massive multi-input multi-output (MIMO), full dimensional MIMO (FD-MIMO), array antenna, analog beamforming, and large scale antenna.

Also being developed are various technologies for the 5G communication system to have an enhanced network, such as evolved or advanced small cell, cloud radio access network (cloud RAN), ultra-dense network, device-to-device (D2D) communication, wireless backhaul, moving network, cooperative communication, coordinated multi-point (CoMP), and reception interference cancellation. There are also other various schemes under development for the 5G system including, e.g., hybrid FSK and QAM modulation (FQAM) and sliding window superposition coding (SWSC), which are advanced coding modulation (ACM) schemes, and filter bank multi-carrier (FBMC), non-orthogonal multiple access (NOMA) and sparse code multiple access (SCMA), which are advanced access schemes.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the Big Data processing technology through connection with a cloud server, has emerged. As technology elements, such as sensing technology, wired/wireless communication and network infrastructure, service interface technology, and security technology have been demanded for IoT implementation, a sensor network, machine-to-machine (M2M) communication, machine type communication (MTC), and so forth have been recently researched.

Such an IoT environment may provide intelligent Internet technology (IT) services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

DETAILED DESCRIPTION OF THE INVENTION

Technical Problem

The disclosure provides an efficient communication method and device in a wireless communication system supporting network slicing.

Further, the disclosure provides a method and device for establishing a session in consideration of the number of sessions in a wireless communication system supporting network slicing.

Further, the disclosure provides an efficient session handover method and device in a wireless communication system supporting network slicing.

Technical Solution

According to an embodiment of the disclosure, a method performed by a user equipment (UE) in a wireless communication system supporting network slicing includes transmitting a session establishment request message for a first network slice via a first access network by the UE, receiving a session establishment reject message from a network entity managing a session for the first network slice via the first access network, and in case that the session establishment reject message includes information indicating excess of a maximum number of sessions for the first network slice as a cause of rejection of a session establishment request, determining a handover to a second access network which is a preferred access network of the UE.

Further, according to an embodiment of the disclosure, a method performed by a network entity managing a session in a wireless communication system supporting network slicing includes receiving a session establishment request message for a first network slice from a user equipment (UE) via a first access network, identifying whether a current number of sessions using the first network slice exceeds a maximum allowed number of sessions, and in case that the current number of sessions exceeds the maximum allowed number of sessions, transmitting a session establishment reject message including information indicating excess of the maximum number of sessions as a cause of rejection of a session establishment request of the UE.

Further, according to an embodiment of the disclosure, a UE in a wireless communication system supporting network slicing includes a transceiver, and a processor configured to transmit a session establishment request message for a first network slice through the transceiver via a first access network, receive a session establishment reject message from a network entity managing a session for the first network slice through the transceiver via the first access network, and in case that the session establishment reject message includes information indicating excess of a maximum number of sessions for the first network slice as a cause of rejection of a session establishment request, determine a handover to a second access network which is a preferred access network of the UE.

Further, according to an embodiment of the disclosure, a network entity managing a session in a wireless communication system supporting network slicing includes a network interface, and a processor configured to receive a session establishment request message for a first network slice from a UE via a first access network through the network interface, identify whether a current number of sessions using the first network slice exceeds a maximum allowed number of sessions, and in case that the current number of sessions exceeds the maximum allowed number of sessions, transmit a session establishment reject message including information indicating excess of the maximum number of sessions as a cause of rejection of a session establishment request of the UE through the network interface.

MODE FOR CARRYING OUT THE INVENTION

Figure 1:
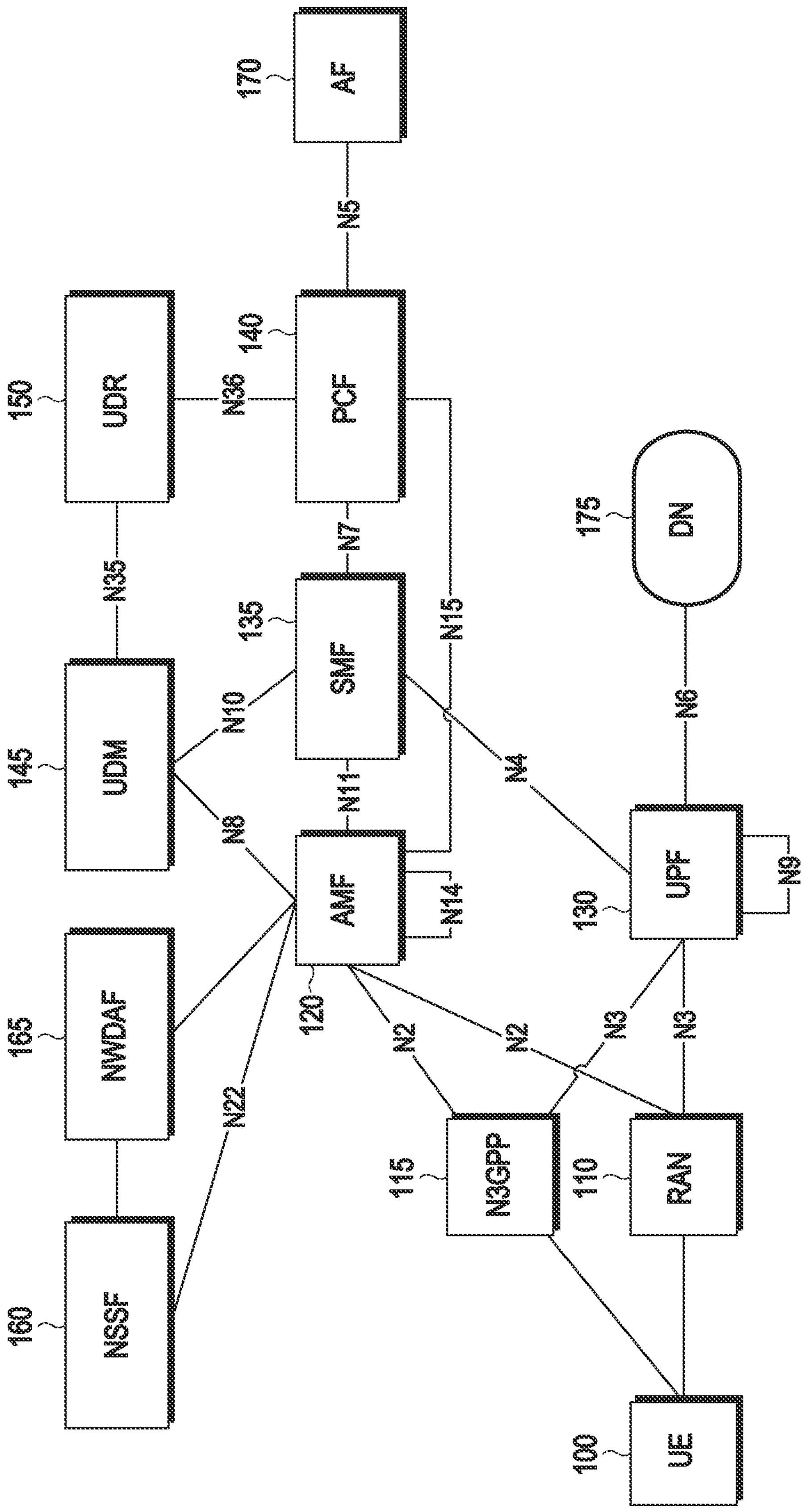
FIG. 1 is a diagram illustrating a structure of a 5th generation system (5GS) according to an embodiment of the disclosure.

The operation principle of the disclosure will be described below in detail with reference to the accompanying drawings. Although the terms as described later are defined in consideration of functions in the disclosure, the terms may be changed according to the intention of a user or an operator, or customs. Therefore, the definitions should be made, not simply by the actual terms used but by the meanings of each term lying within.

Terms indicating network entities, terms indicating messages, and so on as used in the disclosure are illustratively provided, for convenience of description. Accordingly, embodiments of the disclosure are not limited to the terms described below, and other terms having equivalent technical meanings may be used. Further, while the disclosure uses terms and names defined in the 5th generation (5G) system standards, the disclosure may be equally applied to systems conforming to other standards, not limited by the terms and names.

A device according to various embodiments of the disclosure may be any of various electronic devices. For example, an electronic device may include, for example, a portable communication device (e.g., a smartphone), a portable multimedia device, a portable medical device, a camera, a wearable device, a home appliance, or a server. It should be appreciated that various embodiments of the disclosure and the terms used therein are not intended to limit the technological features set forth herein to particular embodiments and include various modifications, equivalents, or alternatives for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise.

As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "$1^{st}$" and "$2^{nd}$", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

Various embodiments of the disclosure may be implemented as software including one or more instructions that are stored in a storage medium (e.g., internal memory or external memory) that is readable by the electronic device. For example, a processor of the electronic device may invoke at least one of the one or more instructions stored in the storage medium, and execute it. This allows the machine to be operated to perform at least one function according to the at least one instruction invoked. The one or more instructions may include a code generated by a complier or a code executable by an interpreter. The electronic device-readable storage medium may be provided in the form of a non-transitory storage medium. Wherein, the term 'non-transitory' simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smartphones) directly. If distributed online, at least part of the computer program product may be temporarily generated or at least temporarily stored in the machine-readable storage medium, such as memory of the manufacturer's server, a server of the application store, or a relay server.

According to various embodiments, each component may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to embodiments of the disclosure, the electronic device may refer to various devices used by a user. For example, the electronic device may be a terminal, a user equipment (UE), a mobile station, a subscriber station, a remote terminal, a wireless terminal, or a user device. For convenience, embodiments of the disclosure will be described below in the context of a UE as an electronic device. Further, an access network (AN) may provide a channel for wireless communication with an electronic device. The AN may be a radio access network (RAN), a base station (BS), an eNB, an eNodeB, a 5G node, a transmission/reception point (TRP), or a $5^{th}$ generation NodeB (5GNB).

The disclosure relates to a method and apparatus for supporting various services in a wireless communication system. Specifically, the disclosure describes a technique of supporting various services by managing a session using a network slice in a wireless communication system. In a wireless communication system supporting network slicing, traffic for different network slices are processed by different protocol data unit (PDU) sessions. A PDU session refers to association between a data network providing a PDU connection service and a UE. The network slicing may be understood as a technology of logically configuring a network with a set of network functions (NFs) for supporting various services having different characteristics such as a broadband communication service, massive Internet of things (IoT), and a mission-critical service such as vehicle-to-everything (V2X), and separating different network slices from each other. Accordingly, even when a communication interruption occurs to any network slice, it does not affect communication of another network slice, thereby enabling stable communication service provision. In the disclosure, the terms 'slice' and 'network slice' are interchangeably used in the same meaning.

In this network environment, when one UE receives various services, the UE may be connected to two or more network slices. An NF may be implemented either as a network element being a software instance running on hardware, or as a virtualized function instantiated on an appropriate platform.

Terms identifying access nodes, terms signifying network entities or NFs, terms signifying messages, terms signifying interfaces between network entities, and terms signifying various types of identification information as used in the description of the disclosure are given by way of example, for convenience of description. Accordingly, the disclosure is not limited to the terms described below, and the terms may be replaced by other equivalent terms in technical meanings.

For convenience of description, the disclosure uses terms and names defined in the $3^{rd}$ generation partnership project long term evolution (3GPP LTE) and 5G standards. However, the disclosure is not limited by the above terms and names. Accordingly, the terms or names defined in the disclosure may be equally applied to systems conforming to other standards.

For the network technology described in the disclosure, a standard specification (e.g., TS 23.501 and TS 23.502) defined by the international telecommunication union (ITU) or the 3GPP may be referred to. Each of components included in a later-described network environment illustrated in FIG. 1 may be a physical entity or may be software or hardware combined with software, which performs an individual function.

Further, according to an embodiment of the disclosure, a core network (CN) may manage at least one of subscriber information about a UE, mobility, access authorization, session establishment, data packet traffic, or a charging policy. The CN may include nodes (or entities) such as a user plane function (UPF), an access and mobility management function (AMF), a session management function (SMF), a user plane function (UPF), a unified data management (UDM), a policy control function (PCF) node, and so on. For a description of the nodes (or entities) included in the CN, a standard specification (e.g., TS 23.501 and TS 23.502) defined by the 3GPP may be referred to.

For convenience of description, the names of NFs (e.g., AMF, SMF, network slicing selection function (NSSF), and so on) are used to indicate entities for exchanging information for access control and state management. However, embodiments of the disclosure are equally applicable even when NFs are actually implemented as instances (AMF instance, SMF instance, NSSF instance, and so on).

FIG. 1 is a diagram illustrating a system structure of a 5G system (5GS) according to an embodiment.

Referring to FIG. 1, a 5G CN may include an AMF 120, an SMF 135, a UPF 130, a PCF 140, a UDM 145, an NSSF 160, a network data analytics function (NWDAF) 165, a non-3GPP function (N3F) 115, and so on. In FIG. 1, reference numerals shown as Nx such as N2, N3, . . . indicate known interfaces between NFs in the 5G CN, and for a related description, a standard specification (TS 23.501) may be referred to. Therefore, a detailed description of the interfaces will be avoided herein.

In FIG. 1, a UE 100 may access the 5G CN through a 3GPP radio access network (RAN) 110 and/or a non-3GPP (N3GPP) AN 115. The UE 100 may be connected to the AMF 120 via an N2 interface and to the UPF 130 via an N3 interface, through the RAN 110. The RAN 110 may also be referred to as BS, "access point (AP)", "eNodeB or eNB", "5G node", "gNodeB or gNB", or other terms having an equivalent technical meaning.

In FIG. 1, the N3GPP AN 115 is an NF that operates as an N2 interface and N3 interface termination for the UE 100 that has accessed through a non-3GPP access network (e.g., Wi-Fi or the like) not defined by the 3GPP. For example, the N3GPP AN 115 may be a non-3GPP interworking function (N3IWF), a trusted non-3GPP gateway function (TGF), a wireline access gateway function (W-AGF), or the like. The N3GPP AN 115 may process N2 control-plane signaling and N3 user-plane packets. The UE connected to the N3GPP AN 115 may be connected to the AMF 120 via the N2 interface and to the UPF 130 via the N3 interface, through the N3GPP AN 115.

In FIG. 1, the AMF 120 is an NF that manages wireless network access and mobility for a UE. The SMF 135 is an NF that manages a session for a UE, and session information includes quality of service (QoS) information, charging information, and packet processing information. The UPF 130 is an NF that processes user traffic (user-plane traffic), and is controlled by the SMF 135. The PCF 140 is an NF that manages an operator policy for providing a service in the wireless communication system. The UDM 145 is an NF that stores and manages UE subscription information. The UDR 150 is an NF that stores and manages data, and UE subscription information stored in the UDR 150 may be used. The UDR 150 may store the UE subscription information and provide the UE subscription information to the UDM 145. In addition, the UDR 150 may store operator policy information and provide the operator policy information to the PCF 140. In FIG. 1, the NWDAF 165 is an NF that provides analysis information to operate the 5G system. The NWDAF 165 may collect data from another NF or an operations, administration, and maintenance (OAM) included in the 5GS, analyze the collected data, and provide analysis results to another NF.

Among NF services provided by the SMF 135 that manages a session, service operations related to a PDU session are defined in the 5G standard (TS 23.502 V16.4.0) as illustrated in Table 1 below.

association update operation between the AMF 120 and the SMF 135 to support the PDU session. For other service operations in Table 1, a related standard may be referred to, and their detailed description will be avoided.

For convenience of description, entities for exchanging information for access control and state management will be generically described as NFs. In the disclosure, an NF may be described as an NF entity, and NFs may be implemented as instances (AMF instance, SMF instance, NSSF instance, and so on, respectively) according to embodiments of the disclosure.

In the disclosure, an instance may refer to a state in which a specific NF exists in the form of software code, and is executable by physical and/or logical resource allocation for executing a function of the NF from a physical computing system, for example, a specific computing system existing on a CN. Therefore, an AMF instance, an SMF instance, and an NSSF instance may mean that physical and/or logical resources are allocated and usable for AMF, SMF, and NSSF operations from a specific computing system existing on the CN, respectively. As a result, physical AMF, SMF, and NSSF devices may perform the same operations as AMF, SMF, and NSSF instances using physical and/or logical resources allocated for AMF, SMF, and NSSF operations by a specific computing system existing on the network. Therefore, in an embodiment of the disclosure, the term NF (AMF, SMF, UPF, NSSF, NRF, SCP, and so on) may be replaced with NF instance, or vice versa. Likewise, the term network

TABLE 1

| Service Name | Service Operations | Operation Semantics | Example Consumer(s) |
|---|---|---|---|
| Nsmf_PDUSession | Create | Request/Response | V-SMF/I-SMF |
| | Update | Request/Response | V-SMF/I-SMF, H-SMF |
| | Release | Request/Response | V-SMF/I-SMF |
| | CreateSMContext | Request/Response | AMF |
| | UpdateSMContext | Request/Response | AMF |
| | ReleaseSMContext | Request/Response | AMF |
| | SMContextStatusNotify | Subscribe/Notify | AMF |
| | StatusNotify | Subscribe/Notify | V-SMF/I-SMF |
| | ContextRequest | Request/Response | AMF, I-SMF, SMF |
| | ContextPush | Request/Response | SMF |
| | SendMOData | Request/Response | AMF |

The 5G system structure of FIG. 1 supports service-based interfaces, and a service-based interface related to the SMF 135 is defined by 'Nsmf' as illustrated in Table 1 above. In Table 1, 'Nsmf_PDUSession' means a service operating in a PDU session, and the service includes creation/deletion/modification operations for the PDU session. These operations may be performed by transmission and reception of a PDU session request/response message between the AMF 120 and the SMF 135.

Further, as in the example of Table 1, the SMF 135 may receive an 'Nsmf_PDUSession_CreateSMContext' request message which is a PDU session request message from the AMF 120 and transmit an 'Nsmf_PDUSession_CreateSMContext' response message to the AMF 120 in response to the received message, as an association create operation between the AMF 120 and the SMF 135 in order to support a PDU session. Further, as in the example of Table 1, the SMF 135 may receive an 'Nsmf_PDUSession_UpdateSMContext' request message which is a PDU session request message from the AMF 120 and transmit an 'Nsmf_PDUSession_UpdateSMContext' response message to the AMF 120 in response to the received message, as an slice may be replaced with network slice instance, or vice versa in an embodiment of the disclosure.

According to an embodiment of the disclosure, in the 5G system defined by the 3GPP, one network slice may be referred to as single-network slice selection assistance information (S-NSSAI). Therefore, the network slice may be identified by the S-NSSAI. The S-NSSAI may include a slice/service type (SST) and a slice differentiator (SD). The SST may indicate the features (e.g., enhanced mobile broadband (eMBB), Internet of things (IoT), ultra-reliable low-latency communication (URLLC), vehicle to everything (V2X), or the like) of a service supported by the slice. The SD may be a value used as an additional identifier (ID) for the specific service indicated by the SST.

An NSSAI may include one or more S-NSSAIs. Examples of the NSSAI may include, but not limited to, a configured NSSAI stored in a UE, a requested NSSAI requested by a UE, an allowed NSSAI that is allowed to be used by a UE, as determined by an NF (e.g., an AMF, an NSSF, or the like) of the 5G CN, and a subscribed NSSAI to which a UE has subscribed.

In the disclosure, the UE 100 may access at least one of a 3GPP access network or an N3GPP access network.

Further, the UE 100 may be simultaneously connected to the 3GPP access network and the N3GPP access network to be registered in the 5G system.

Access network may be replaced by various terms such as BS, AN, access point (AP), and so on. For example, the 3GPP access network may be a network using a licensed band, and the N3GPP access network may be a network using an unlicensed band, which does not limit network classification.

Specifically, the UE 100 may access the 3GPP RAN 110 and perform a registration procedure with the AMF 120. During the registration procedure, the AMF 120 may determine an allowed slice (Allowed NSSAI) available to the UE 100 which has accessed the 3GPP RAN 110 and allocate the allowed slice to the UE 100. This is referred to as a first allowed slice. The UE 100 may access the N3GPP AN 115 and perform a registration procedure with the AMF 120. During the registration procedure, the AMF 120 may determine an allowed slice (Allowed NSSAI) available to the UE 100 which has accessed the N3GPP AN 115 and allocate the allowed slice to the UE 100. This is referred to as a second allowed slice. The first allowed slice and the second allowed slice may include the same S-NSSAI or different S-NSSAIs. In the disclosure, the first allowed slice and the second allowed slice may use the same S-NSSAI or different S-NSSAIs.

A mobile communication operator may define the size of available network resources on a network slice basis. In the disclosure, this may be referred to as a network slice policy (or a slice policy). Slice policy information may include at least one piece of the following information.

S-NSSAI

Maximum number of PDU sessions

Method of counting the maximum number of sessions

The maximum number of sessions included in the slice policy information according to an embodiment of the disclosure may indicate the maximum number of session(s) established using the S-NSSAI. NFs (e.g., the AMF, the SMF, and so on) of the 5G CN may count the number of session(s) that uses a specific S-NSSAI established in a PDU session establishment procedure. According to an embodiment of the disclosure, the maximum number of sessions may indicate the largest value of the number of sessions using the S-NSSAI. For example, if the maximum number of sessions for an eMBB slice is 100,000, the 5G CN (or at least one NF in the 5G CN) may allow up to 100,000 sessions for session requests including an S-NSSAI indicating the eMBB slice.

According to an embodiment of the disclosure, the 5G CN (or the at least one NF in the 5G CN) may store and manage slice policy information in an NF. The slice policy information stored in the NF may be determined by a policy of the mobile communication operator. The mobile communication operator may store and update the slice policy information in the NF in an operation, administration and maintenance (OAM) manner.

According to an embodiment of the disclosure, an NF of the 5G CN (or the at least one NF in the 5G CN) may obtain the slice policy information from another NF of the 5G CN.

Figure 2:
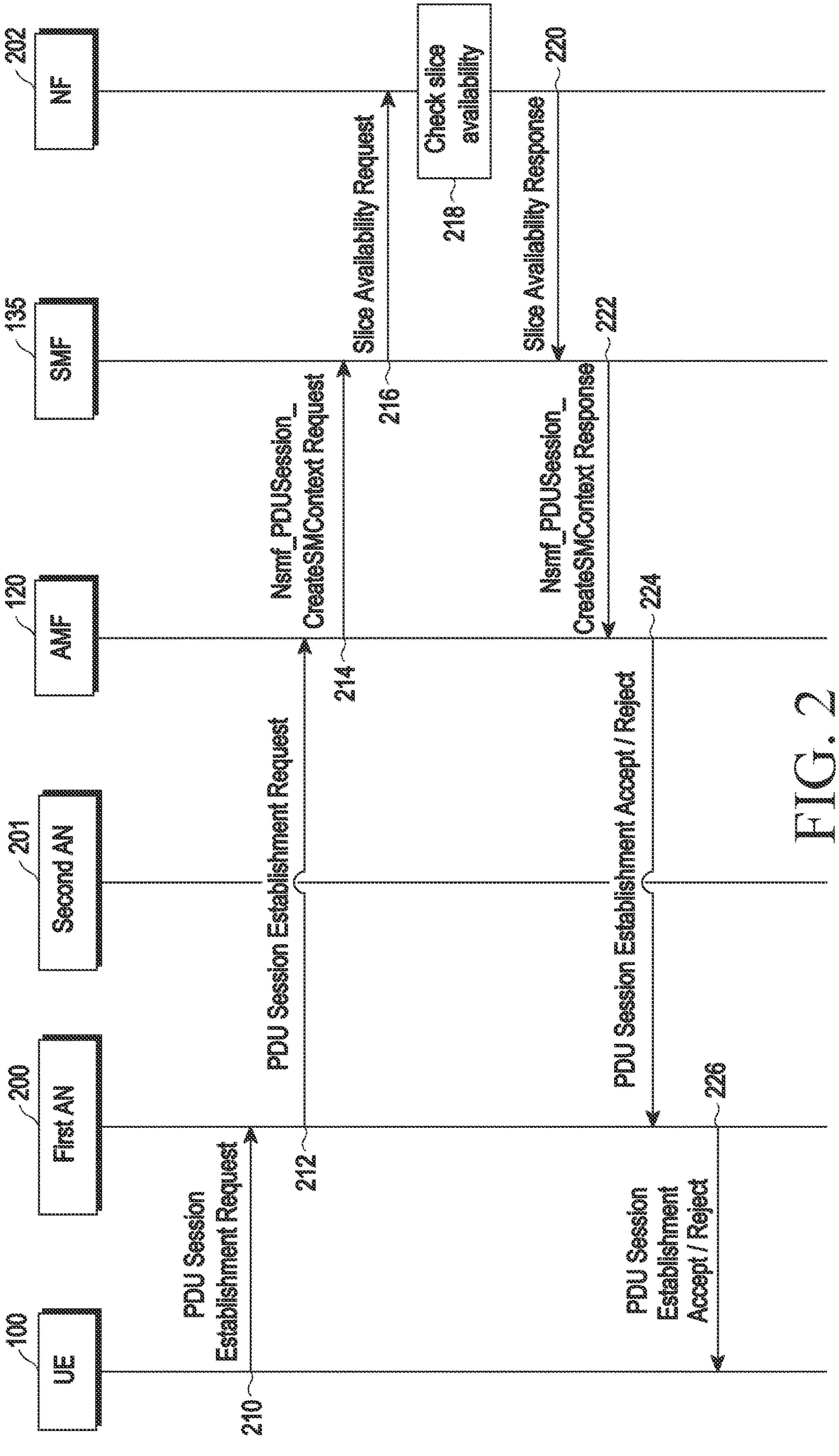
FIG. 2 is a diagram illustrating a protocol data unit (PDU) session establishment procedure according to an embodiment of the disclosure.

FIG. 2 is a diagram illustrating a PDU session establishment procedure according to an embodiment of the disclosure. In FIG. 2, the basic operations of the UE 100, ANs 200 and 201, the AMF 120, and the SMF 135 are the same as the corresponding configurations of FIG. 1, and thus their detailed description will be avoided.

Referring to FIG. 2, the UE 100 according to an embodiment of the disclosure may access the first AN 200 and perform the PDU session establishment procedure. The first AN 200 may be the 3GPP RAN 110 or the N3GPP AN 115.

In step 210, the UE 100 may access the first AN 200 and transmit a PDU Session Establishment Request message. The PDU Session Establishment Request message may include information about a slice that the UE intends to use (i.e., for which the UE requests session establishment). The information about the slice that the UE intends to use may include an S-NSSAI.

The UE 100 may include information about a preferred access type in the PDU Session Establishment Request message. The preferred access type may indicate the type (e.g., 3GPP AN, N3GPP AN, or the like) of an AN preferred by the UE 100 for the S-NSSAI that uses a PDU session requested by the UE.

According to an embodiment of the disclosure, the preferred access type may be set in relation to an AN currently accessed by the UE 100. In this case, the UE 100 may set the preferred access type to an AN type supported by the currently accessed first AN 200.

According to another embodiment, the preferred access type may be set regardless of the AN currently accessed by the UE 100. In this case, the UE 100 may set the preferred access type to the AN type supported by the currently accessed first AN 200 or an AN type not supported by the currently accessed first AN 200. For example, although the first AN 200 currently accessed by the UE 100 is a 3GPP AN, the preferred access type may be set to N3GPP AN, or although the first AN 200 currently accessed is an N3GPP AN, the preferred access type may be set to 3GPP AN.

In step 212, upon receipt of the PDU Session Establishment Request message, the first AN 200 according to an embodiment of the disclosure may select the AMF 120 to which the PDU Session Establishment Request message is to be transmitted. The first AN 200 may transmit the PDU Session Establishment Request message to the selected AMF 120. In step 214, the AMF 120 may transmit a PDU Session Establishment Request message to the SMF 135. The PDU Session Establishment Request message includes information included in the PDU Session Establishment Request message in step 210, for example, at least one of the information about the slice that the UE 100 intends to use (i.e., the slice for which the UE 100 requests session establishment) or the preferred access type.

For example, an Nsmf_PDUSession_CreateSMContext Request message described in Table 1 above may be used as the PDU Session Establishment Request message that the AMF 120 transmits to the SMF 135.

The SMF 135 may process the PDU session request. The SMF 135 may determine whether the requested S-NSSAI is to be counted in a maximum number of sessions. For example, the SMF 135 may determine whether the requested S-NSSAI is to be counted in the maximum number of sessions based on a local configuration stored in the SMF 135. Alternatively, the SMF 135 may determine whether the requested S-NSSAI is to be counted in the maximum number of sessions based on subscription information about the UE 100 received from the UDM 145. Alternatively, all S-NSSAIs requested from the SMF 135 may be counted in the maximum number of sessions. In addition, all or some S-NSSAIs may be counted in the maximum number of sessions, or S-NSSAIs to be counted in the maximum number of sessions may be determined/set in various ways in a combination of at least one of per operator, per region, per time zone, or per traffic type.

When the requested S-NSSAI is counted in the maximum number of sessions, the SMF 135 may inquire an NF 202 of the 5G CN (or at least one NF in the 5G CN) about the availability of the slice before determining to allow the session establishment for the UE 100 in step 216. The NF 202 may be any of various entities (or instances) such as the PCF 140, the AMF 120, the SMF 135, the UPF 130, the UDM 145, the NWDAF 165, the NSSF 160, the UDR 150, a 3rd party, an application function (AP), and a network exposure function (NEF) (not shown) for edge computing.

To this end, the SMF 135 may transmit a Slice Availability Request message to the NF 202. In another embodiment, when the NF 202 is the SMF 135, the SMF 135 may directly determine the availability of the slice, and thus the request/response message transmission and reception in steps 216 and 220 may be skipped. The Slice Availability Request message of step 216 may include at least one of the information (e.g., the S-NSSAI or the like) about the slice, information (e.g., 3GPP, N3GPP, or the like) about the AN of the UE 100, the preferred access type, UE location information (e.g., a tracking area (TA) or the like), or UE information (e.g., a subscription permanent identifier (SUPI), a 5G globally unique temporary identifier (5G-GUTI), or the like).

Meanwhile, when the preferred access type requested/set by the UE 100 is included in the Nsmf_PDUSession_CreateSMContext Request message transmitted in step 214, the SMF 135 may store the preferred access type.

According to another embodiment, the SMF 135 may obtain information about a preferred access type for the S-NSSAI from the UDM 145 or the PCF 140. The SMF 135 may store the preferred access type received from the UDM 145 or the PCF 140. According to another embodiment, the SMF 135 may determine a preferred access type for the S-NSSAI based on an operator policy (a local configuration, a local policy, or the like). The SMF 135 may store the preferred access type according to the operator policy.

When the information about the preferred access type for the S-NSSAI is provided by the UDM 145 or the PCF 140, or the preferred access type for the S-NSSAI is determined based on the operator policy, the information about the preferred access type may not be included in the request message of step 210. In another embodiment, when the information about preferred access type is included in the Request message in step 210, and the information about the preferred access type for the S-NSSAI is provided by the UDM 145, the PCF 140, or the operator policy as described above, a preferred access type may be determined according to the predetermined priorities of the plurality of preferred access types.

In step 218, the NF 202 may identify a slice policy for the slice (e.g., the S-NSSAI or the like) received from the SMF 135 and the current number of sessions for the slice.

For example, the NF 202 compares the maximum number of sessions included in the slice policy for the slice with the current number of sessions for the slice. If the current number of sessions for the slice has not reached the maximum number of sessions (i.e., when the current number of sessions is less than the maximum number of sessions), the NF 202 may determine that the slice is currently available. If the target slice is currently available, the NF 202 may increase the current number of sessions for the slice by one, based on the request message of step 216.

According to another example, for example, the NF 202 may compare the maximum number of sessions in the slice policy for the slice with the current number of sessions for the slice. When the current session number of the target slice has reached the maximum number of sessions (i.e., when the number of current sessions is equal to the maximum number of sessions), the NF 202 may determine that the slice is not currently available.

In step 220, the NF 202 may transmit a Slice Availability Response message to the SMF 135. At least one of the information (e.g., S-NSSAI or the like) about the slice or information indicating whether the slice is available (e.g., an indication indicating whether the slice is available or unavailable or a cause value of unavailability) may be included in the Slice Availability Response message.

The SMF 135 may determine whether to allow the session establishment according to the availability of the slice indicated by the NF 202. For example, when the NF 202 indicates that the slice (S-NSSAI) is available, the SMF 135 may determine to accept the request for establishing the PDU session using the slice (S-NSSAI). In another embodiment, for example, when the NF 202 transmits a message indicating that the slice (S-NSSAI) is unavailable, the SMF 135 may determine to reject the request for establishing the PDU session using the slice (S-NSSAI).

In step 222, the SMF 135 may transmit a response message for the PDU Session Establishment Request message received in step 214 to the AMF 120. For example, the Nsmf_PDUSession_CreateSMContext Response message described in Table 1 may be used as the response message.

When the SMF 135 determines to accept the request for establishing the PDU session using the slice (S-NSASI), the response message that the SMF 135 transmits to the AMF 120 in step 222 may include a PDU Session Establishment Accept message (or information indicating Accept). When the SMF 135 determines to reject the request for establishing the PDU session using the slice (S-NSASI), the response message that the SMF 135 transmits to the AMF 120 in step 222 may include a PDU Session Establishment Reject message (or information indicating Reject).

Subsequently, the AMF 120 may transmit the PDU Session Establishment Accept/Reject message received from the SMF 135 to the UE 100 through the first AN 200 in steps 224 and 226.

Figure 3:
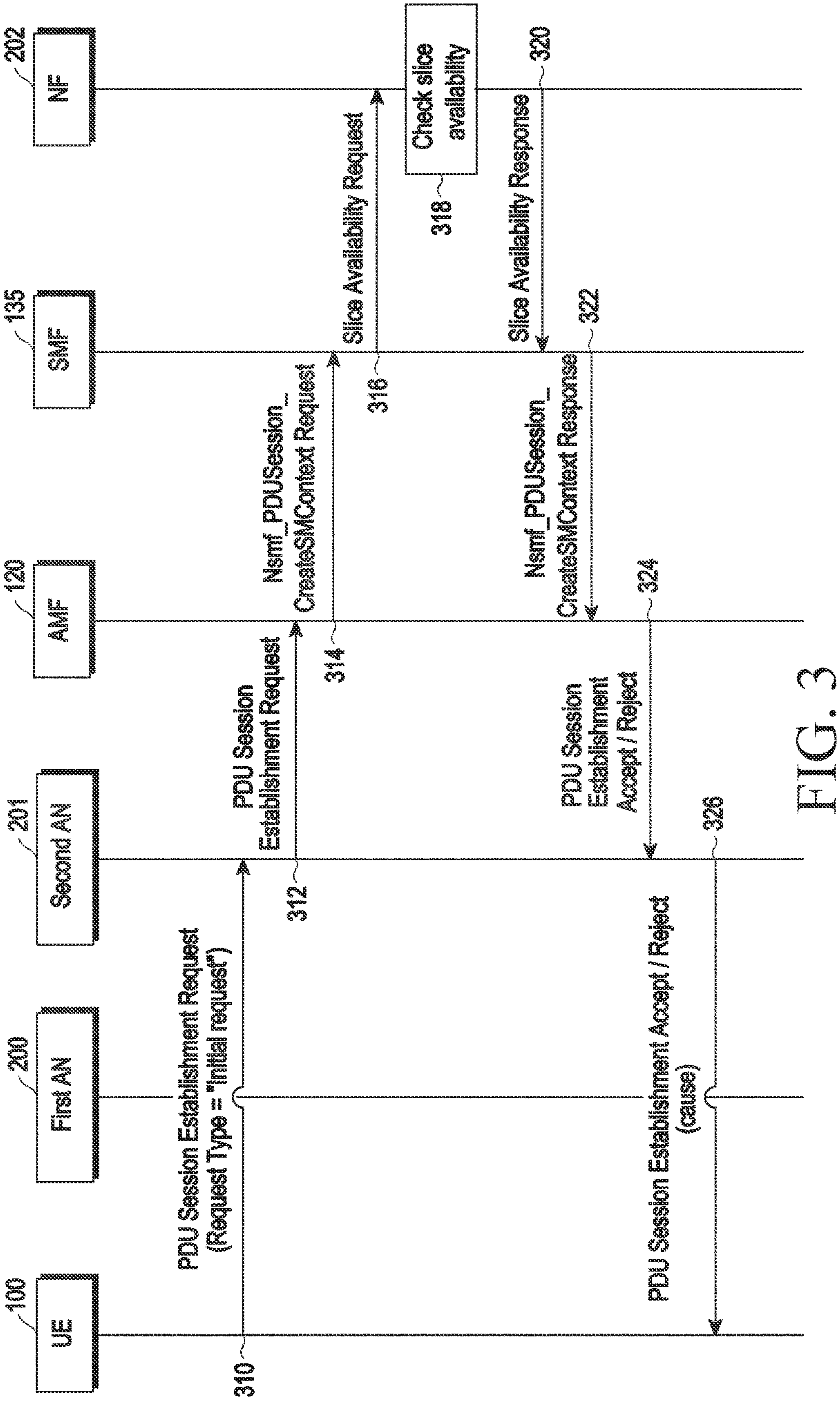
FIG. 3 is a diagram illustrating a PDU session establishment procedure according to an embodiment of the disclosure.

FIG. 3 is a diagram illustrating a PDU session establishment procedure according to an embodiment of the disclosure. In FIG. 3, the basic operations of the UE 100, the ANs 200 and 201, the AMF 120, and the SMF 135 are the same as the corresponding configurations of FIG. 1, and thus their detailed description will be avoided. It is assumed that the procedure of FIG. 3 is performed in a state in which a session for an S-NSSAI requested by the UE 100 is established according to the procedure of FIG. 2.

Referring to FIG. 3, the UE 100 according to an embodiment of the disclosure may access the second AN 201 and perform the PDU session establishment procedure. The second AN 201 may be the 3GPP RAN 110 or the N3GPP AN 115.

In step 310, the UE 100 may access the second AN 201 and transmit a PDU Session Establishment Request message. The PDU Session Establishment Request message may include information about a slice that the UE 100 intends to use (i.e., for which the UE 100 requests session establishment). The information about the slice that the UE 100 intends to use may include an S-NSSAI. Further, the S-NSSAI may be the same as or different from the S-NSSAI that the UE 100 is using in the PDU session established through the first AN 200 through the procedure illustrated in FIG. 2.

Further, the UE 100 may include information about a preferred access type in the PDU Session Establishment Request message of step 310. The preferred access type may indicate the type (e.g., 3GPP AN, N3GPP AN, or the like) of an AN preferred by the UE 100 for the S-NSSAI that uses a PDU session requested by the UE. According to an embodiment of the disclosure, the preferred access type may be set in relation to an AN currently accessed by the UE 100. In this case, the UE 100 may set the preferred access type to an AN type supported by the currently accessed second AN 201. According to another embodiment, the preferred access type may be set regardless of the AN currently accessed by the UE 100. In this case, the UE 100 may set the preferred access type to the AN type supported by the currently accessed second AN 201 or an AN type not supported by the currently accessed second AN 201. For example, although the second AN 201 currently accessed by the UE 100 is an N3GPP AN, the preferred access type may be set to 3GPP AN, or although the second AN 201 currently accessed is a 3GPP AN, the preferred access type may be set to N3GPP AN.

When the preferred access type for the S-NSSAI is included in the PDU Session Establishment Request message transmitted in step 210 of FIG. 2, the UE 100 according to an embodiment of the disclosure may not include the preferred access type in the PDU Session Establishment Request message transmitted in step 310 of FIG. 3. In another embodiment, the UE 100 that wants to change the preferred access type for the S-NSSAI requested in step 210 of FIG. 2 may include a changed/updated preferred access type in the PDU Session Establishment Request message transmitted in step 310 of FIG. 3. For example, although the UE 100 indicates 3GPP AN as the preferred access type for the S-NSSAI in step 210, the UE 100 may change the preferred access type to N3GPP AN in step 310.

Further, in an embodiment of the disclosure, the UE 100 may set the request type of the PDU Session Establishment Request message to “initial request”.

In step 312, upon receipt of the PDU Session Establishment Request message, the second AN 201 according to an embodiment of the disclosure may select the AMF 120 to which the PDU Session Establishment Request message is to be transmitted. The second AN 201 may transmit the PDU Session Establishment Request message to the selected AMF 120.

In step 314, the AMF 120 may transmit a PDU Session Establishment Request message to the SMF 135. The PDU Session Establishment Request message includes information included in the PDU Session Establishment Request message in step 310, for example, at least one of the information about the slice that the UE 100 intends to use (i.e., the slice for which the UE 100 requests session establishment) or the preferred access type.

When the request type of the PDU Session Establishment Request message is “initial request”, for example, an Nsmf_PDUSession_CreateSMContext Request message described in Table 1 above may be used as the PDU Session Establishment Request message that the AMF 120 transmits to the SMF 135.

The SMF 135 may process the PDU session request. The SMF 135 may determine whether the requested S-NSSAI is to be counted in a maximum number of sessions. For example, the SMF 135 may determine whether the requested S-NSSAI is to be counted in the maximum number of sessions based on a local configuration stored in the SMF 135. Alternatively, the SMF 135 may determine whether the requested S-NSSAI is to be counted in the maximum number of sessions based on subscription information received from the UDM 145. Alternatively, all S-NSSAIs requested from the SMF 135 may be counted in the maximum number of sessions. In addition, all or some S-NSSAIs may be counted in the maximum number of sessions, or S-NSSAIs to be counted in the maximum number of sessions may be determined/set in various ways in a combination of at least one of per operator, per region, per time zone, or per traffic type.

When the requested S-NSSAI is counted in the maximum number of sessions, the SMF 135 may inquire the NF 202 of the 5G CN (or at least one NF in the 5G CN) about the availability of the slice before determining to allow the session establishment for the UE 100 in step 316. To this end, the SMF 135 may transmit a Slice Availability Request message to the NF 202. As described in the embodiment of FIG. 2, the Slice Availability Request message may include at least one of the information (e.g., the S-NSSAI or the like) about the slice, information (e.g., 3GPP, N3GPP, or the like) about the AN of the UE 100, the preferred access type, UE location information (e.g., a TA or the like), or UE information (e.g., a SUPI, a 5G-GUTI, or the like).

Meanwhile, when the preferred access type requested/set by the UE 100 is included in the Nsmf_PDUSession_CreateSMContext Request message transmitted in step 314, the SMF 135 may store the preferred access type. For example, in the absence of a preferred access type for the S-NSSAI, the SMF 135 may store the preferred access type. Alternatively, in the presence of a preferred access type for the S-NSSAI, the SMF 135 may update the stored preferred access type with received new preferred access type information.

According to another embodiment, the SMF 135 may obtain information about a preferred access type for the S-NSSAI from the UDM 145 or the PCF 140. The SMF 135 may store the preferred access type received from the UDM 145 or the PCF 140. According to another embodiment, the SMF 135 may determine a preferred access type for the S-NSSAI based on an operator policy (a local configuration, a local policy, or the like). The SMF 135 may store the preferred access type according to the operator policy.

When the information about the preferred access type for the S-NSSAI is provided by the UDM 145 or the PCF 140, or the preferred access type for the S-NSSAI is determined based on the operator policy, the information about the preferred access type may not be included in the request message of step 310. In another embodiment, when the information about preferred access type is included in the Request message in step 210, and the information about the preferred access type for the S-NSSAI is provided by the UDM 145, the PCF 140, or the operator policy as described above, a preferred access type may be determined according to the predetermined priorities of the plurality of preferred access types.

In step 318, the NF 202 may identify a slice policy for the slice (e.g., the S-NSSAI or the like) received from the SMF 135 and the current number of sessions for the slice.

For example, the NF 202 compares the maximum number of sessions included in the slice policy for the slice with the current number of sessions for the slice. If the current number of sessions for the slice has not reached the maximum number of sessions, the NF 202 may determine that the slice is currently available. If the target slice is currently available, the NF 202 may increase the current number of sessions for the slice by one, based on the request message of step 316.

According to another example, for example, the NF 202 may compare the maximum number of sessions in the slice policy for the slice with the current number of sessions for the slice. When the current session number of the target slice has reached the maximum number of sessions, the NF 202 may determine that the slice is not currently available.

In step 320, the NF 202 may transmit a Slice Availability Response message to the SMF 135. At least one of the information (e.g., S-NSSAI or the like) about the slice or information indicating whether the slice is available (e.g., an indication indicating whether the slice is available or unavailable or a cause value of unavailability) may be included in the Slice Availability Response message.

The SMF 135 may determine whether to allow the session establishment according to the availability of the slice indicated by the NF 202. For example, when the NF 202 indicates that the slice (S-NSSAI) is available, the SMF 135 may determine to accept the request for establishing the PDU session using the slice (S-NSSAI). In another embodiment, for example, when the NF 202 transmits a message indicating that the slice (S-NSSAI) is unavailable, the SMF 135 may determine to reject the request for establishing the PDU session using the slice (S-NSSAI).

In step 322, the SMF 135 may transmit a response message for the PDU Session Establishment Request message received in step 214 to the AMF 120. For example, the Nsmf_PDUSession_CreateSMContext Response message described in Table 1 may be used as the response message.

When the SMF 135 determines to reject the request for establishing the PDU session using the slice (S-NSASI), the response message that the SMF 135 transmits to the AMF 120 in step 322 may include a PDU Session Establishment Reject message (or information indicating Reject). When the SMF 135 determines to accept the request for establishing the PDU session using the slice (S-NSASI), the response message that the SMF 135 transmits to the AMF 120 in step 322 may include a PDU Session Establishment Accept message (or information indicating Accept).

Subsequently, the AMF 120 may transmit the PDU Session Establishment Accept/Reject message received from the SMF 135 to the UE 100 through the second AN 201 in steps 324 and 326.

In the embodiments of FIGS. 2 and 3, the PDU Session Establishment Reject message may include a cause value indicating a cause of rejection.

According to an embodiment of the disclosure, the value indicating the cause of rejection may be a value indicating that the maximum number of sessions has been reached (e.g., Quota is overflown, excess of the quota, or the like). The SMF 135 may set a value indicating the cause of rejection based on the information received from the NF 202 in steps 220 and 320.

According to another example, the value indicating the cause of the rejection may be a value indicating that the maximum number of sessions has been reached and that session handover is available. The SMF 135 may set a value indicating the cause of rejection based on at least one of the information received from the NF 202 in steps 220 and 320, a session-related context of the UE 100, or the preferred access type for the S-NSSAI.

For example, when the UE 100, which has established a PDU session for an S-NSSAI through the first AN 200 and is using the PDU session, requests establishment of a PDU session using the same S-NSSAI through the second AN 201, and the corresponding S-NSSAI is not currently available (quota is overflown), the SMF 135 may set a value indicating that the maximum number of sessions has been reached but session handover is available, as the value indicating the cause of rejection. When the SMF 135 sets the value indicating the cause of rejection in this manner, a preferred access type may be considered. For example, a preferred AN type may be determined from between the first AN 200 and the second AN 201 based on the preferred access type. If an AN supported by the second AN 201 receiving the PDU session request is preferred to an AN supported by the first AN 200 using the PDU session, the SMF 135 may set the value indicating that session handover is available as a value indicating rejection of the session establishment request.

In addition, the PDU Session Establishment Reject message may include a back-off time associated with the rejected S-NSSAI. The back-off time may mean that the UE 100 does not perform a specific operation (e.g., SM NAS signaling) for a time set as the back-off time. For example, during the time set as the back-off time, the UE 100 may not request a new PDU session for the S-NSSAI for a time set as the back-off time associated with the S-NSSAI included in the PDU Session Establishment Reject message. When it is said that the UE is not allowed to request a new PDU session for an S-NSSAI, this may mean that the UE does not transit a PDU Session Establishment Request message including the S-NSSAI as a network slice and a request type set to “initial request”. In addition, the back-off time may not affect a specific operation performed by the UE 100. For example, the UE 100 may perform a PDU session handover procedure or a PDU session modification procedure for the time set as the back-off time. The PDU session handover procedure may mean that a PDU Session Establishment Request message including the S-NSSAI as a network slice and a request type set to “Existing PDU Session” may be transmitted. The PDU session modification procedure may mean that a PDU Session Modification Request message including the S-NSSAI as a network slice may be transmitted.

Upon receipt of the PDU Session Establishment Reject message, the UE 100 may identify that the PDU session request has been rejected because the maximum number of sessions has been reached, based on the cause value included in the PDU Session Establishment Reject message.

The UE 100 may determine the next operation based on at least one of the information received in steps 226 and 326 and session-related information stored by the UE 100.

The UE 100 according to an embodiment of the disclosure may request a PDU session again after the time set as the back-off time included in the PDU Session Establishment Reject message. After the back-off time elapses (after a back-off timer expires), the request type of the PDU Session Establishment Request message may be set to “initial request”. The back-off time may be applied for the same public land mobile network (PLMN) regardless of an AN.

The UE 100 according to another embodiment may determine handover of the PDU session established through the first AN 200 to the second AN 201. The UE 100 may request the session handover before the back-off time expires, and the request type of a PDU Session Establishment Request message for requesting the session handover may be set to “Existing PDU Session”. In this case, the PDU session established through the first AN 200 and the PDU session moved to the second AN 201 may be sessions using the same S-NSSAI. The session handover procedure according to an embodiment of the disclosure will be described in detail with reference to FIG. 4.

As described in the embodiment of FIG. 2 and/or the embodiment of FIG. 3, when the PDU Session Establishment Reject message includes a cause value indicating the cause of rejection, and a value indicating that session handover is available is included as the cause value indicating rejection of the session establishment request, the handover procedure of FIG. 4 to be described later may be triggered. Accordingly, the embodiment of FIG. 2 and/or the embodiment of FIG. 3 and the embodiment of FIG. 4 may be implemented in combination.

Figure 4:
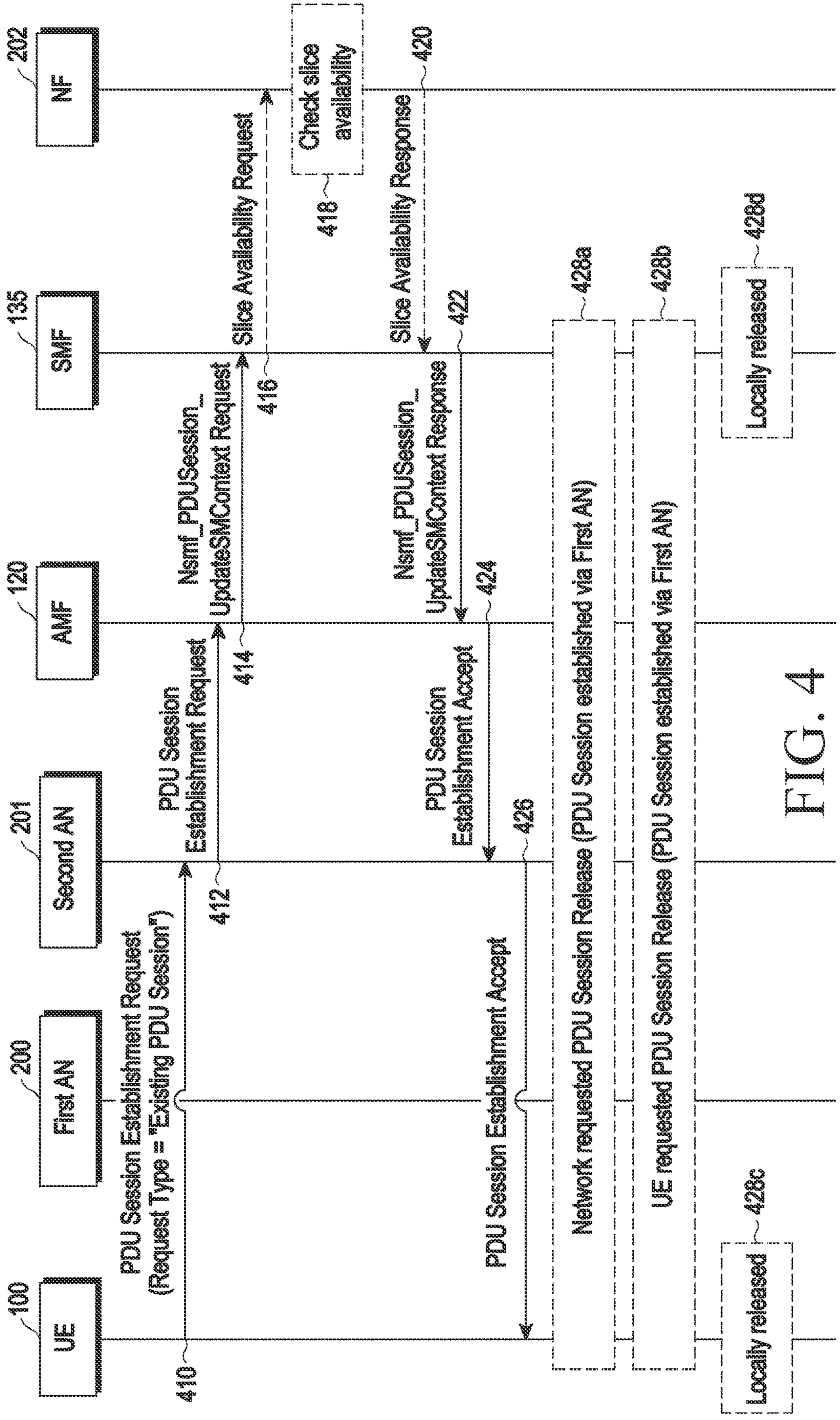
FIG. 4 is a diagram illustrating a PDU session handover procedure according to an embodiment of the disclosure.

FIG. 4 is a diagram illustrating a PDU session handover procedure according to an embodiment of the disclosure. The embodiment of FIG. 4 is based on the assumption that the UE 100 is using a PDU session through the first AN 200.

Referring to FIG. 4, the UE 100 according to an embodiment of the disclosure may determine handover of the PDU session being used through the first AN 200 to the second AN 201.

In step 410, the UE 100 may transmit a PDU Session Establishment Request message by accessing the second AN 201 for session handover. The UE 100 may set the request type of the PDU Session Establishment Request message to, for example, "Existing PDU Session".

The PDU Session Establishment Request message may include a PDU Session ID of the PDU session which is currently being used by the UE 100 and subject to session handover.

The PDU Session Establishment Request message may include information about a slice that the UE 100 intends to use. The information about the slice that the UE 100 intends to use may include an S-NSSAI. The S-NSSAI may be the same as an S-NSSAI for the PDU session being used through the first AN 200, for which the UE 100 intends handover.

In step 412, upon receipt of the PDU Session Establishment Request message according to an embodiment of the disclosure may select an AMF to which the PDU Session Establishment Request message is to be transmitted. The second AN 201 may transmit the PDU Session Establishment Request message to the selected AMF 120.

In step 414, the AMF 120 may transmit a PDU Session Establishment Request message to the SMF 135. When the request type of the PDU session request message is "Existing PDU Session", the PDU Session Establishment Request message that the AMF 120 transmits to the SMF 135 may be, for example, the Nsmf_PDUSession_UpdateSMContext Request message described in Table 1 above. That is, it may be a request for updating a session management (SM) context related to the PDU session being used through the first AN 200, rather than a request for creating a new SM context. The SM context may include information related to the PDU session, for example, a PDU Session ID, an AN type used by the PDU session, and so on.

The SMF 135 may process the PDU session request. The SMF 135 may determine whether the requested S-NSSAI is to be counted in a maximum number of sessions. For example, the SMF 135 may determine whether the requested S-NSSAI is to be counted in the maximum number of sessions based on a local configuration stored in the SMF 135. Alternatively, the SMF 135 may determine whether the requested S-NSSAI is to be counted in the maximum number of sessions based on subscription information received from the UDM 145. Alternatively, all S-NSSAIs requested from the SMF 135 may be counted in the maximum number of sessions.

When the requested S-NSSAI is to be counted in the maximum number of sessions, and the request type is "Existing PDU Session", the SMF 135 may identify that the PDU session request is a request for handover of the ongoing PDU session established by the first AN 200 to the second AN 201. The SMF 135 may identify a session context corresponding to a PDU session ID (i.e., the PDU Session ID of the PDU session which is currently being used by the UE 100 and subject to the session handover) included in the PDU Session Establishment Request message. If there is a PDU session corresponding to the PDU session ID, the SMF 135 may determine handover of the PDU session established and used in the first AN 200 to the second AN 201. Accordingly, the SMF 135 may determine that a slice availability check related to the maximum number of sessions is not needed. That is, in view of handover of the PDU session being used through the first AN 200 to the second AN 201, the SMF 135 may determine that it is not necessary to count the number of currently used session. Accordingly, the SMF 135 may not perform steps 416 to 420 for checking slice availability. Alternatively, the SMF 135 may perform steps 416 to 420 to notify the NF 202 that the AN type of the PDU session that the UE 100 is using for the S-NSSAI is changed (e.g., from the AN supported by the first AN 200 to the AN supported by the second AN 201).

In step 422, the SMF 135 may transmit a response message for the PDU Session Establishment Request message received in step 414 to the AMF 120. This response message may be, for example, the Nsmf_PDUSession_UpdateSMContext Response message described in Table 1 above.

If the SMF 135 determines to accept the PDU session handover using the slice (S-NSASI), the response message transmitted to the AMF 120 by the SMF 135 in step 422 may include a PDU Session Establishment Accept message indicating session handover acceptance. If the SMF 135 decides to reject the PDU session handover using the slice (S-NSASI), the response message transmitted to the AMF 120 by the SMF 135 in step 422 may include a PDU Session Establishment Reject message indicating session handover rejection, while not shown.

In steps 424 and 426, the AMF 120 may transmit the PDU Session Establishment Accept message received from the SMF 135 to the UE 100 through the second AN 201. When the PDU Session Establishment Reject message is transmitted, the same operation may be performed.

Subsequently, upon receipt of the PDU Session Establishment Accept message, the UE 100 may identify that handover of the PDU session being used through the first AN 200 to the second AN 201 is successful.

The SMF 135 that has processed the session handover may determine to release the PDU session established through the first AN 200 and perform a PDU session release procedure in step 428*a*.

Alternatively, the UE 100 that has identified the success of the session handover may determine to release the PDU session established through the first AN 200 and perform a PDU session release procedure in step 428*b*.

Alternatively, in steps 428*c* and 428*d*, each of the SMF 135 that has processed the session handover and the UE 100 that has identified the success of the session handover may delete PDU session information related to the first AN 200.

In the embodiment of FIG. 4, the PDU session release may be performed through steps 428*a* and 428*b* or steps 428*c* and 428*d*.

Further, according to an embodiment of the disclosure, the PDU session handover procedure illustrated in FIG. 4 may take place, when the UE 100 is not capable of using the slice (S-NSSAI) through the first AN 200 (e.g., when the S-NSSAI is not included in an allowed NSSAI for the first AN 200, when the S-NSSAI is included among rejected S-NSSAIs for the first AN 200, when the UE is deregistered through the first AN 200, or the like). In this case, the AMF 120 may perform an operation of maintaining a PDU session-related SM context stored in the SMF 135 in case the procedure of FIG. 4 takes place, as follows.

The AMF 120 that has determines not to include the S-NSSAI in the allowed NSSAI for the first AN 200 may perform an operation of excluding the S-NSSAI from the allowed NSSAI for the first AN 200 after a certain time elapses (e.g., after a timer expires), not immediately.

Alternatively, the AMF 120 that has determines to include the S-NSSAI in the rejected S-NSSAIs for the first AN 200 may perform an operation of including the S-NSSAI in the rejected S-NSSAIs for the first AN 200 after a certain time elapses (e.g., after a timer expires), not immediately.

Alternatively, the AMF 120 that has determined UE deregistration through the first AN 200 may perform the UE deregistration through the first AN 200 after a certain time elapses (e.g., after a timer expires), not immediately.

Alternatively, when the UE 100 is not capable of using the slice (S-NSSAI) through the first AN 200, the AMF 120 may instruct the SMF 135 to delete the PDU session-related SM context after a certain time elapses (e.g., after a timer expires), not immediately. The AMF 120 may transmit the Nsmf_PDUSession_UpdateSMContext or Nsmf_PDUSession_ReleaseSMContext Request message illustrated in Table 1 above to instruct the SMF 135 to delete the PDU session-related SM context. Upon receipt of the Nsmf_PDUSession_UpdateSMContext or Nsmf_PDUSession_ReleaseSMContext Request message, the SMF 120 may delete the related SM context.

Alternatively, when the UE 100 is not capable of using the slice (S-NSSAI) through the first AN 200, the AMF 120 may instruct the SMF 135 to delete the PDU session-related SM context after a specific time elapses. For example, the Nsmf_PDUSession_UpdateSMContext or Nsmf_PDUSession_ReleaseSMContext Request message illustrated in Table 1, which the AMF 120 transmits to instruct the SMF 135 to delete the PDU session-related SM context, may include time information (a timer). Upon receipt of the Nsmf_PDUSession_UpdateSMContext or Nsmf_PDUSession_ReleaseSMContext Request message, the SMF 120 may delete the related SM context after a time included in the received message elapses (after the timer expires).

Figure 5:
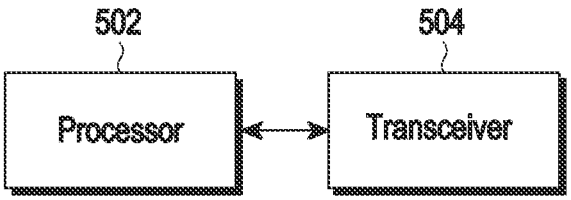
FIG. 5 is a diagram illustrating an exemplary configuration of a user equipment (UE) 100 according to an embodiment of the disclosure.

FIG. 5 is a diagram illustrating an exemplary configuration of the UE 100 according to an embodiment of the disclosure.

Referring to FIG. 5, the UE 100 may be implemented to include a processor 502 and a transceiver 504 for performing wireless communication according to a communication method determined in the communication system having the configuration of FIG. 1. The processor 501 may control the operation of the transceiver 903, and provide overall control to the device to perform the session establishment procedure and the session handover procedure according to the method described in at least one of the embodiments of FIGS. 1 to 4.

Figure 6:
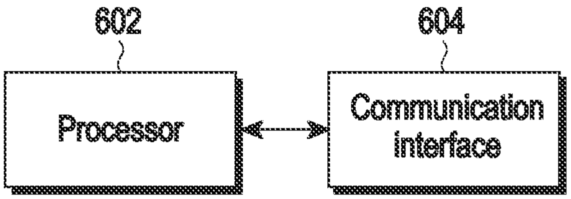
FIG. 6 is a diagram illustrating a configuration of a network entity according to an embodiment of the disclosure.

FIG. 6 is a diagram illustrating a configuration of a network entity (or NF) according to an embodiment of the disclosure. The network entity (or NF) may be one of the components other than the UE 100 in the configuration of FIG. 1.

The network entity (or NF) of FIG. 6 may be implemented to include a processor 602 and a communication interface 604 for performing wired/wireless communication according to a communication method determined in the communication system having the configuration of FIG. 1. The processor 602 may control the operation of the communication interface 604, and provider overall control the device to perform the session establishment procedure and the session handover procedure according to the method described in at least one of the embodiments of FIGS. 1 to 4.

While specific embodiments have been described in detail in the disclosure, it is obvious that various modifications are possible without departing from the scope of the disclosure. Therefore, the scope of the disclosure should be defined by the appended claims and their equivalents, not limited to the described embodiments.

The invention claimed is:

1. A method performed by a network entity in a wireless communication system including a 3rd generation partnership project (3GPP) access network and a non-3GPP access network, the method comprising:
- receiving, from a session management function (SMF), a request message including information on an access type for a network slice associated with a protocol data unit (PDU) session, the information on the access type including at least one of the 3GPP access network or the non-3GPP access network;
- determining whether to increase a current number of PDU sessions for the network slice, based on the information on the access type; and
- transmitting, to the SMF, a response message including a result indication related to the determination.

2. The method of claim 1, wherein the network entity is configured with a maximum number of PDU sessions for single-network slice selection assistance information (S-NSSAI) identifying the network slice.

3. The method of claim 1, wherein the network entity receives the request message including the information on the access type from the SMF in a network slice related availability check procedure.

4. The method of claim 1, wherein the network entity receives the information on the access type from the SMF in a PDU session establishment procedure.

5. The method of claim 1, wherein the non-3GPP access network includes a wireless local area network (WLAN).

6. The method of claim 1, wherein the result indication is related to a maximum number of PDU sessions for the network slice being reached or the maximum number of PDU sessions for the network slice being not reached.

7. A network entity in a wireless communication system including a 3$^{rd}$ generation partnership project (3GPP) access network and a non-3GPP access network, the network entity comprising:
- a transceiver; and
- a processor coupled with the transceiver and configured to:
  - receive, via the transceiver from a session management function (SMF), a request message including information on an access type for a network slice associated with a protocol data unit (PDU) session, the information on the access type including at least one of the 3GPP access network or the non-3GPP access network,
  - determine whether to increase a current number of PDU sessions for the network slice, based on the information on the access type; and
- transmit, to the SMF, a response message including a result indication related to the determination.

8. The network entity of claim 7, wherein the network entity is configured with a maximum number of PDU sessions for single-network slice selection assistance information (S-NSSAI) identifying the network slice.

9. The network entity of claim 7, wherein the processor is further configured to receive, via the transceiver, the request message including the information on the access type from the SMF in a network slice related availability check procedure.

10. The network entity of claim 7, wherein the processor is further configured to receive, via the transceiver, the information on the access type from the SMF in a PDU session establishment procedure.

11. The network entity of claim 7, wherein the non-3GPP access network includes a wireless local area network (WLAN).

12. The network entity of claim 7, wherein the result indication is related to a maximum number of PDU sessions for the network slice being reached or the maximum number of PDU sessions for the network slice being not reached.

* * * * *